(12) United States Patent
Palumbo et al.

(10) Patent No.: US 12,528,252 B2
(45) Date of Patent: Jan. 20, 2026

(54) SELECTABLE MEDIA FILTER AND SPARGER ASSEMBLIES AND RELATED METHODS OF FABRICATION AND USE

(71) Applicant: Mott Corporation, Farmington, CT (US)

(72) Inventors: Vincent P. Palumbo, East Granby, CT (US); Matthew Siok, Farmington, CT (US)

(73) Assignee: MOTT CORPORATION, Farmington, CT (US)

( * ) Notice: Subject to any disclaimer, the term of this patent is extended or adjusted under 35 U.S.C. 154(b) by 447 days.

(21) Appl. No.: 18/089,099

(22) Filed: Dec. 27, 2022

(65) Prior Publication Data
US 2023/0202119 A1   Jun. 29, 2023

Related U.S. Application Data

(60) Provisional application No. 63/294,248, filed on Dec. 28, 2021.

(51) Int. Cl.
*B29C 64/393*   (2017.01)
*B29C 64/153*   (2017.01)
(Continued)

(52) U.S. Cl.
CPC .......... *B29C 64/393* (2017.08); *B29C 64/153* (2017.08); *B33Y 10/00* (2014.12); *B33Y 50/02* (2014.12); *B33Y 80/00* (2014.12)

(58) Field of Classification Search
CPC .................................................... B29C 64/393
See application file for complete search history.

(56) References Cited

U.S. PATENT DOCUMENTS

2012/0285877 A1   11/2012   Burgess et al.
2013/0239546 A1   9/2013   Levin et al.
(Continued)

FOREIGN PATENT DOCUMENTS

| CN | 112094107 A | * 12/2020 | ............ B01D 39/14 |
| EP | 3302767 B1 | 5/2019 | |
| KR | 20200113475 A | * 10/2020 | |

OTHER PUBLICATIONS

International Preliminary Report on Patentability issued Jun. 20, 2024 by the PCT for Application No. PCT/US2022/054073 filed on Dec. 27, 2022, 6 pages.

(Continued)

*Primary Examiner* — Suresh Suryawanshi
(74) *Attorney, Agent, or Firm* — CANTOR COLBURN LLP

(57) ABSTRACT

The present disclosure provides advantageous selectable media filter and sparger assemblies, and improved systems/methods for utilizing and/or fabricating the selectable media filter and sparger assemblies. More particularly, the present disclosure provides selectable media filter and sparger assemblies fabricated at least in part by additive manufacturing (e.g., via a 3D printing process, such as, for example, via a laser powder bed fusion (LPBF) process, via an electron-beam melting ("EBM") process, via an inkjet or a binder-jet additive manufacturing process, etc.), the selectable media filter and sparger assemblies including a plurality of filtration and/or sparging members attached to a single housing, with each filtration/sparging member having an independent connection port.

17 Claims, 9 Drawing Sheets

(51) Int. Cl.
  *B33Y 10/00* (2015.01)
  *B33Y 50/02* (2015.01)
  *B33Y 80/00* (2015.01)

(56) References Cited

U.S. PATENT DOCUMENTS

| | | |
|---|---|---|
| 2013/0270165 A1 | 10/2013 | Shevitz |
| 2015/0232505 A1 | 8/2015 | Konstantinov et al. |
| 2017/0239726 A1 | 8/2017 | Palumbo et al. |
| 2018/0283794 A1 | 10/2018 | Cerny et al. |
| 2020/0023294 A1* | 1/2020 | Rodriguez ............ B01D 29/016 |
| 2020/0179836 A1* | 6/2020 | Immel .................. B01D 29/031 |
| 2022/0023807 A1* | 1/2022 | Damren ................ C12M 27/02 |

OTHER PUBLICATIONS

Extended EP Search report mailed Feb. 12, 2025, EP Application 22917280, 6 pages.
Cramer et al.; "Alumina-based filters made via binder jet 3D printing of alumina powder, colloidal silica infiltration, and sintering"; DOE Pages; Article [online]. Aug. 2021 [retrieved Mar. 13, 2023]. Retrieved from the Internet: https://www.osti.gov/pages/biblio/1817563.
International Search Report for International Application No. PCT/US2022/054073; International Filing Date Dec. 27, 2022; Date of Mailing Jun. 5, 2023; 2 pages.
Written Opinion for International Application No. PCT/US2022/054073; International Filing Date Dec. 27, 2022; Date of Mailing Jun. 5, 2023; 4 pages.
Yan et al.; "Electron beam melting in the fabrication of three-dimensional mesh titanium mandibular prosthesis scaffold"; Scientific Reports; Article [online]. Jan. 2018 [retrieved Mar. 13, 2023]. Retrieved from the Internet: http://www.nature.com/articles/s41598-017-15564-6.

\* cited by examiner

SELECTABLE MEDIA FILTER AND SPARGER ASSEMBLIES AND RELATED METHODS OF FABRICATION AND USE

CROSS REFERENCE TO RELATED APPLICATIONS

This application claims the benefit of U.S. Application No. 63/294,248, filed on Dec. 28, 2021 which is incorporated herein by reference in its entirety.

FIELD OF THE DISCLOSURE

The present disclosure relates to selectable media filter and sparger assemblies and related methods of fabrication and use and, more particularly, to selectable media filter and sparger assemblies fabricated at least in part by additive manufacturing (e.g., via a 3D printing process, such as, for example, via a laser powder bed fusion (LPBF) process, via an electron-beam melting ("EBM") process, via an inkjet or a binder-jet additive manufacturing process, etc.), the selectable media filter and sparger assemblies including a plurality of filtration and/or sparging members attached to a single housing, with each filtration/sparging member having an independent connection port.

BACKGROUND OF THE DISCLOSURE

Current practice provides that for both sparging and filtration, this can require the user to swap out components which requires interruption of the process system as well as increased time required to perform the swaps.

An interest exists for improved assemblies and related methods of fabrication and use.

These and other inefficiencies and opportunities for improvement are addressed and/or overcome by the assemblies, systems and methods of the present disclosure.

BRIEF SUMMARY OF THE DISCLOSURE

The present disclosure provides advantageous selectable media filter and sparger assemblies, and improved systems/methods for utilizing and/or fabricating the selectable media filter and sparger assemblies. More particularly, the present disclosure provides selectable media filter and sparger assemblies fabricated at least in part by additive manufacturing (e.g., via a 3D printing process, such as, for example, via a laser powder bed fusion (LPBF) process, via an electron-beam melting ("EBM") process, via an inkjet or a binder-jet additive manufacturing process, etc.), the selectable media filter and sparger assemblies including a plurality of filtration and/or sparging members attached to a single housing, with each filtration/sparging member having an independent connection port.

The present disclosure provides for a selectable media filter and sparger assembly including a plurality of filtration and/or sparging members attached to a housing; and each filtration and/or sparging member having an independent connection port; and wherein the selectable media filter and sparger assembly is fabricated at least in part by additive manufacturing.

The present disclosure also provides for a selectable media filter and sparger assembly wherein the housing is a single housing.

The present disclosure also provides for a selectable media filter and sparger assembly wherein the housing is a solid housing cap.

The present disclosure also provides for a selectable media filter and sparger assembly further including a support member extending from the housing.

The present disclosure also provides for a selectable media filter and sparger assembly wherein the support member is a solid center support member extending from the housing.

The present disclosure also provides for a selectable media filter and sparger assembly wherein the assembly includes five filtration and/or sparging members attached to the housing.

The present disclosure also provides for a selectable media filter and sparger assembly wherein the plurality of filtration and/or sparging members are fabricated with a variety of different pore structures and/or densities; and wherein the plurality of filtration and/or sparging members are fabricated at least in part from a metal.

The present disclosure also provides for a selectable media filter and sparger assembly wherein each filtration and/or sparging member has a helical shape and can be further modified to maximize a porous media surface area without increasing the overall length or width of the assembly.

The present disclosure also provides for a selectable media filter and sparger assembly wherein each independent connection port can accept a variety of fittings for filtrate removal or supply gas or liquid.

The present disclosure also provides for a selectable media filter and sparger assembly wherein the assembly can be used for any sparging applications that require gas or liquid mass transfer; and wherein the assembly can be used for filtration applications requiring specific particle size capture of feed stock or particle size selection in filtrate material, and/or for filtration of ions, molecules, or chemicals, and/or including nano/molecular level filtration.

The present disclosure also provides for a method for fabricating a selectable media filter and sparger assembly including providing a plurality of filtration and/or sparging members attached to a housing; wherein each filtration and/or sparging member includes an independent connection port; and wherein the selectable media filter and sparger assembly is fabricated at least in part by additive manufacturing.

The present disclosure also provides for a method for fabricating a selectable media filter and sparger assembly wherein the selectable media filter and sparger assembly is fabricated at least in part by a 3D printing process.

The present disclosure also provides for a method for fabricating a selectable media filter and sparger assembly wherein the selectable media filter and sparger assembly is fabricated at least in part by a laser powder bed fusion (LPBF) process.

The present disclosure also provides for a method for fabricating a selectable media filter and sparger assembly wherein the selectable media filter and sparger assembly is fabricated at least in part by an electron-beam melting ("EBM") process.

The present disclosure also provides for a method for fabricating a selectable media filter and sparger assembly wherein the selectable media filter and sparger assembly is fabricated at least in part by an inkjet or a binder-jet additive manufacturing process.

The above described and other features are exemplified by the following figures and detailed description.

Any combination or permutation of embodiments is envisioned. Additional advantageous features, functions and applications of the disclosed assemblies, systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following figures are exemplary embodiments wherein the like elements are numbered alike.

Features and aspects of embodiments are described below with reference to the accompanying drawings, in which elements are not necessarily depicted to scale.

Figure 1:
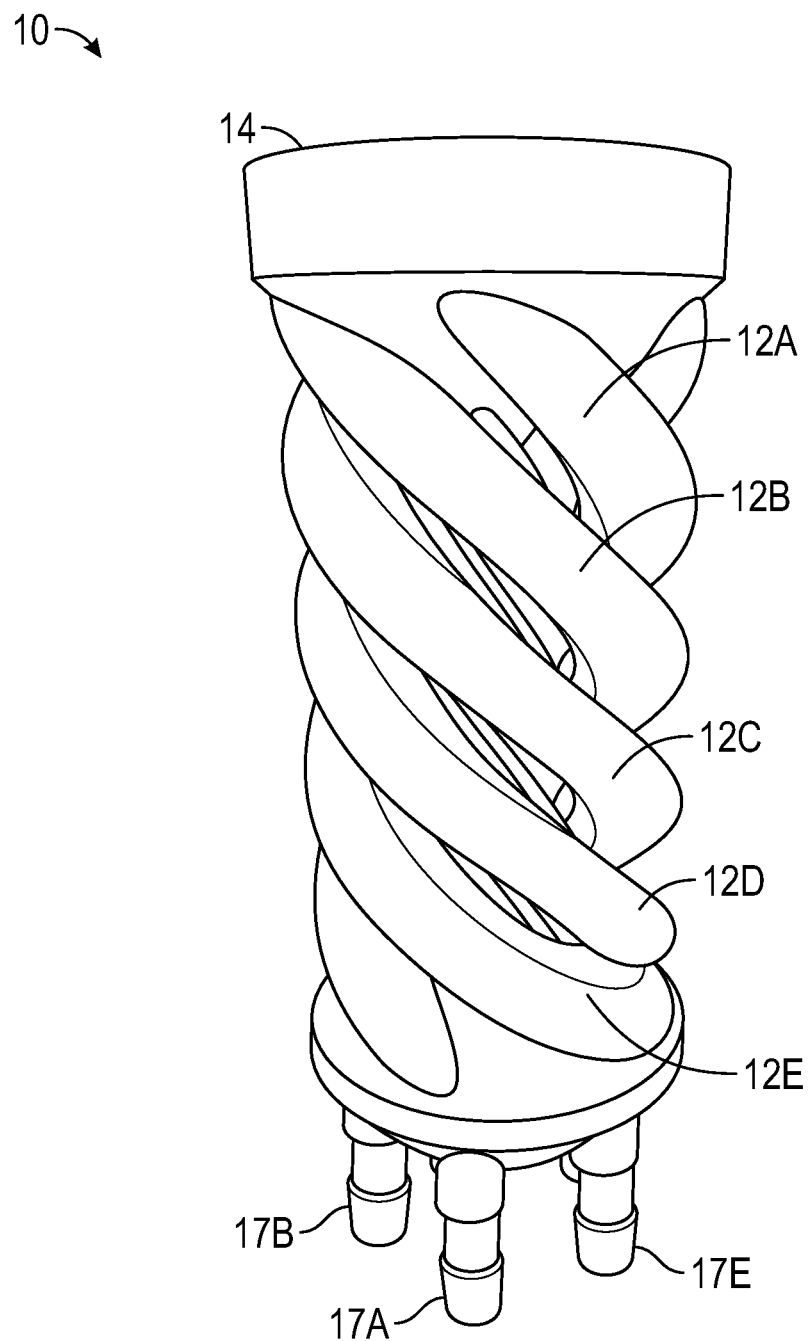

Exemplary embodiments of the present disclosure are further described with reference to the appended figures. It is to be noted that the various features, steps, and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein:

FIG. 1 is a side perspective view of an exemplary selectable media filter and sparger assembly, according to the present disclosure.

Figure 2:
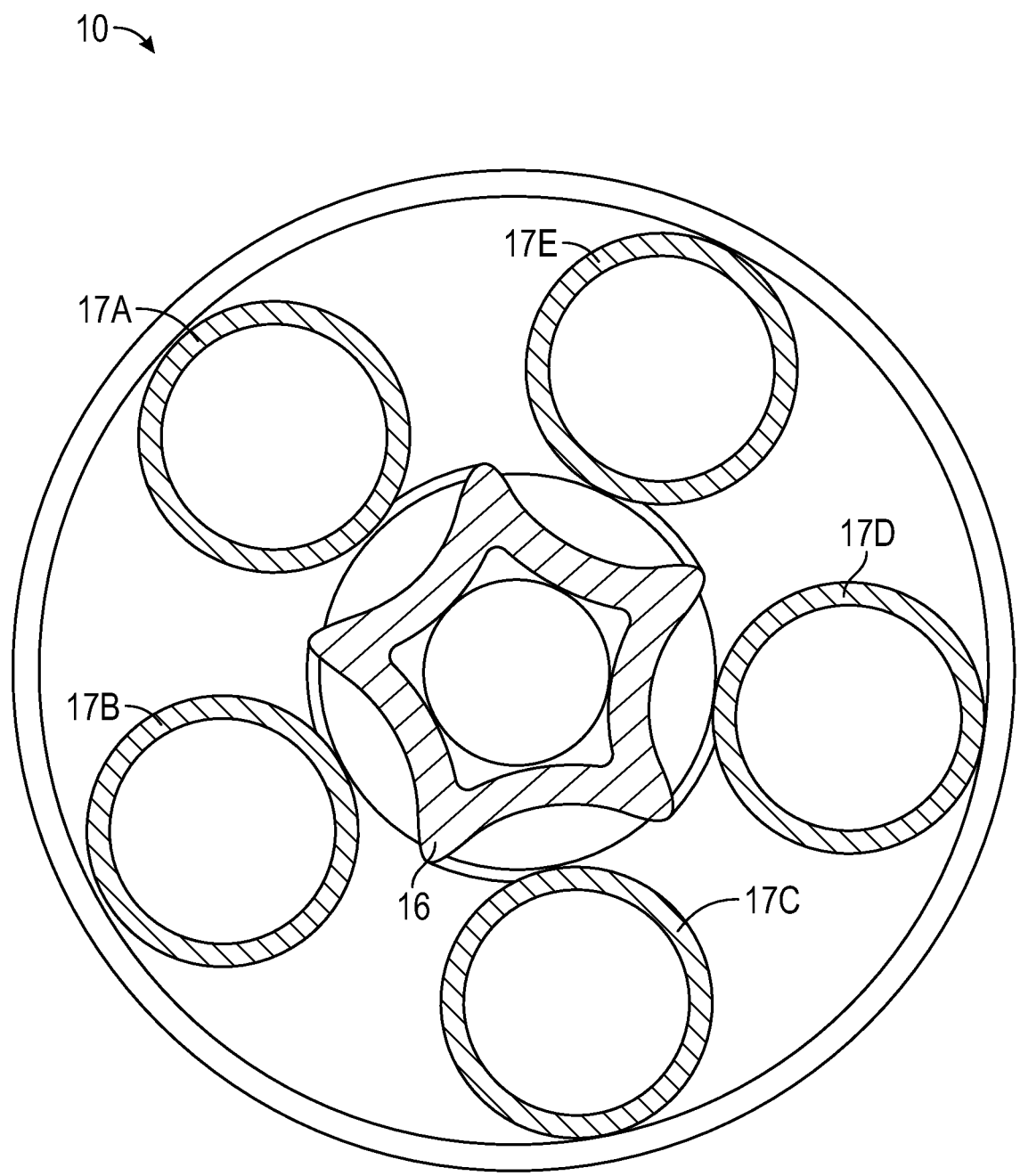

FIG. 2 is a bottom view of the assembly of FIG. 1.

Figure 3:
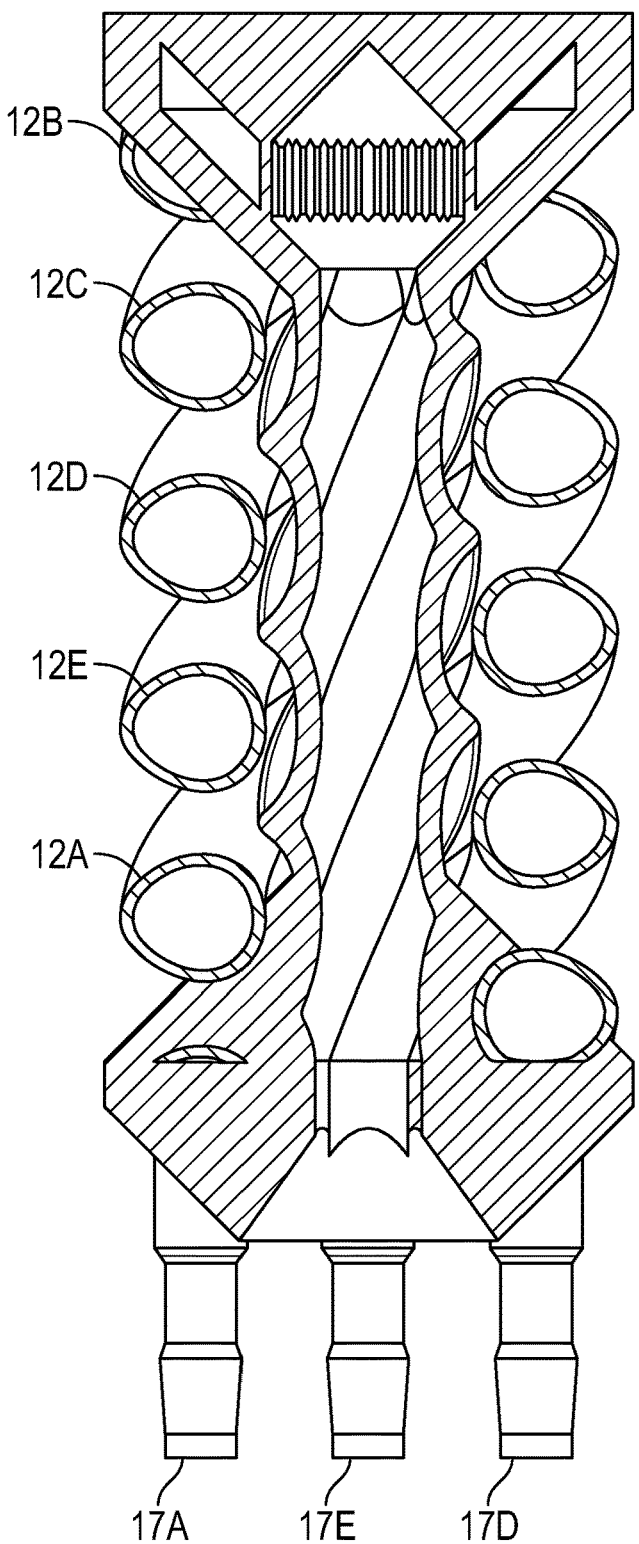

FIG. 3 is a side cross-sectional view of the assembly of FIG. 1.

Figure 4:
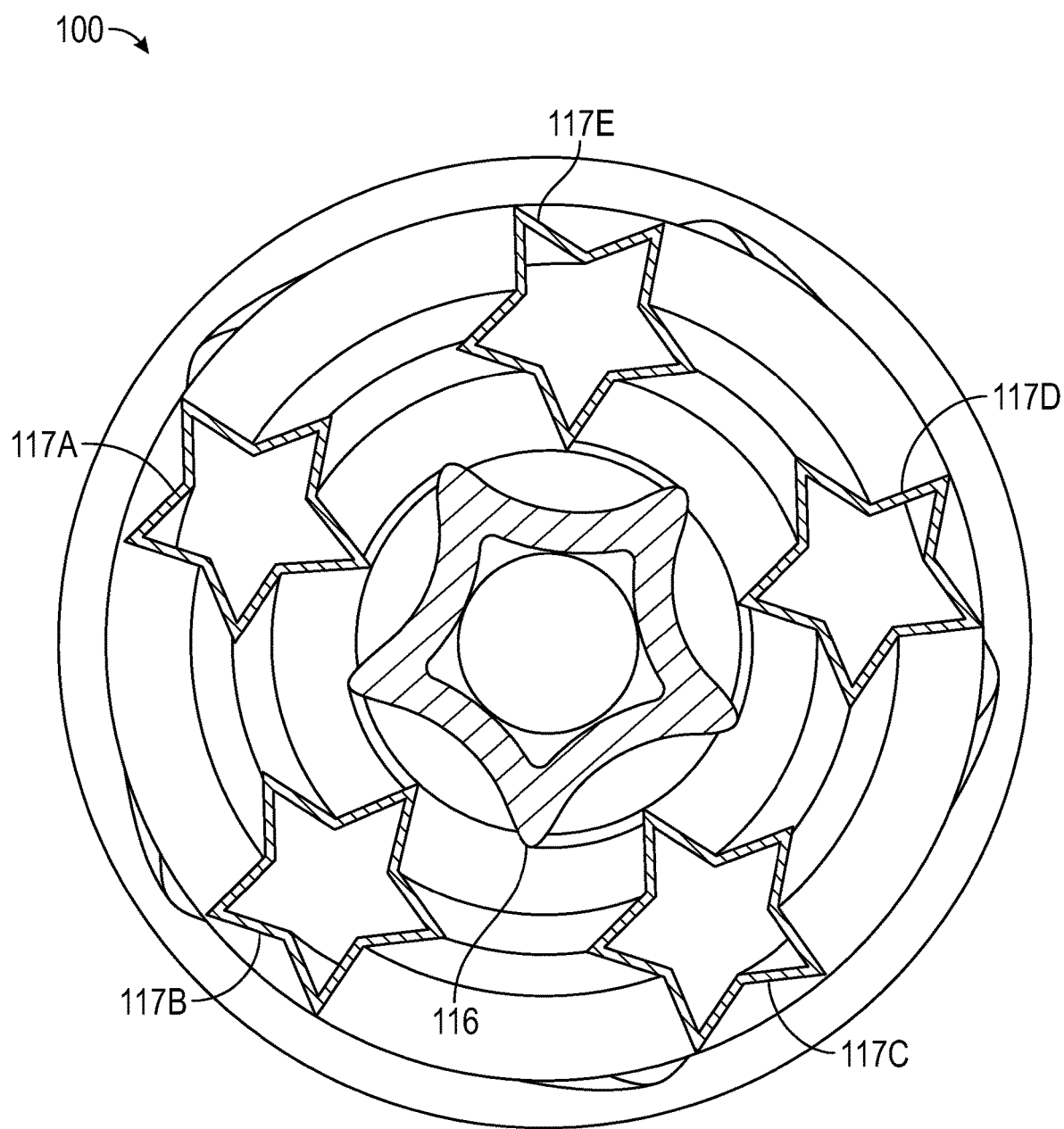

FIG. 4 is a bottom view of another exemplary selectable media filter and sparger assembly, according to the present disclosure.

Figure 5:
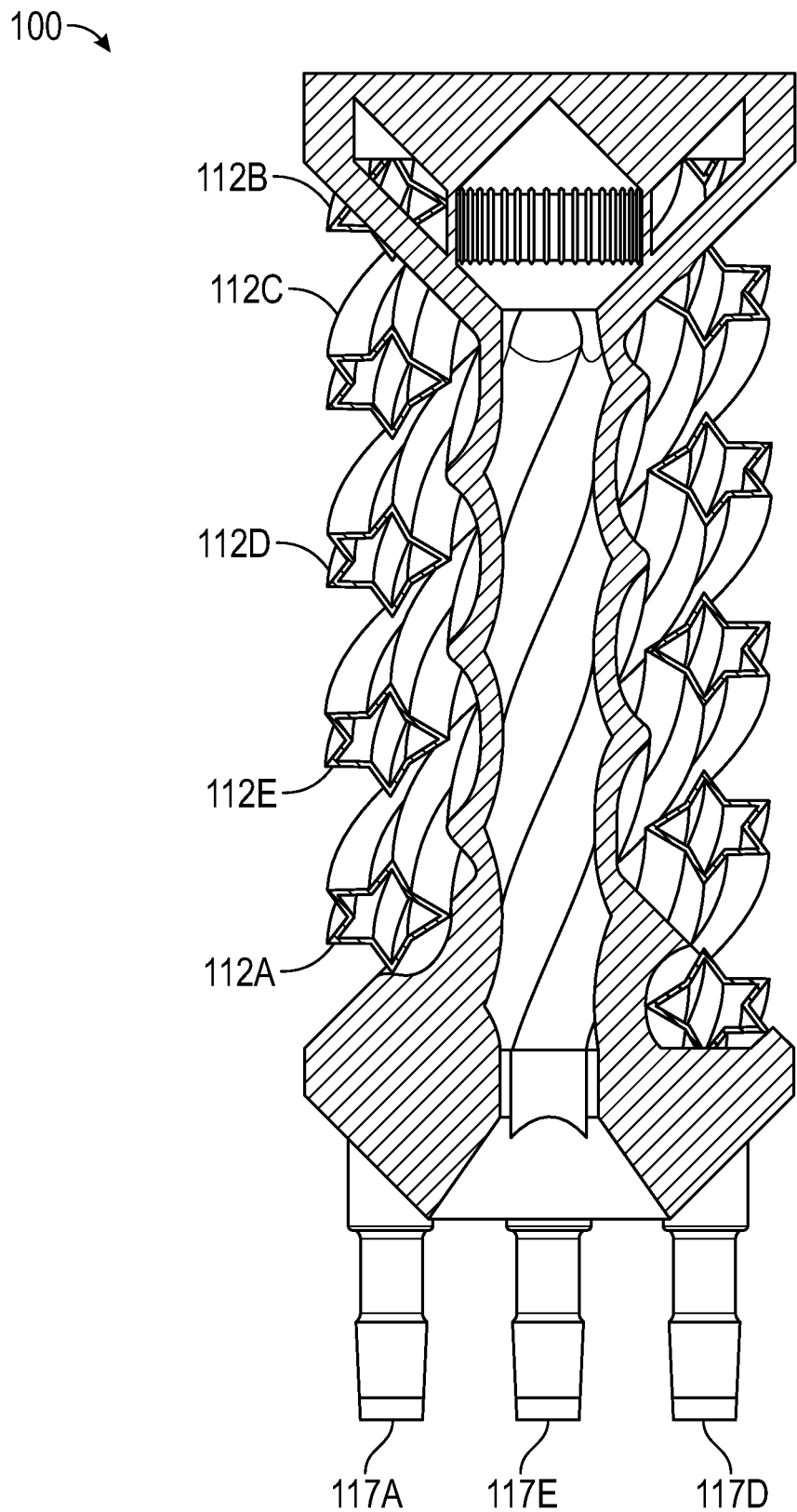

FIG. 5 is a side cross-sectional view of the assembly of FIG. 4.

Figure 6A:
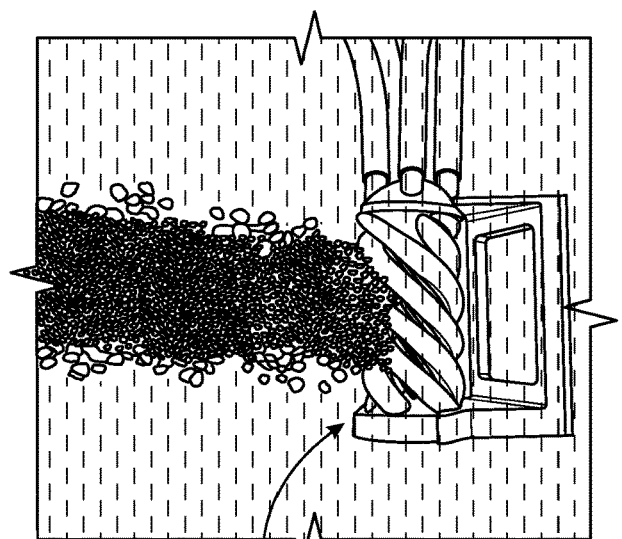
Figure 6B:
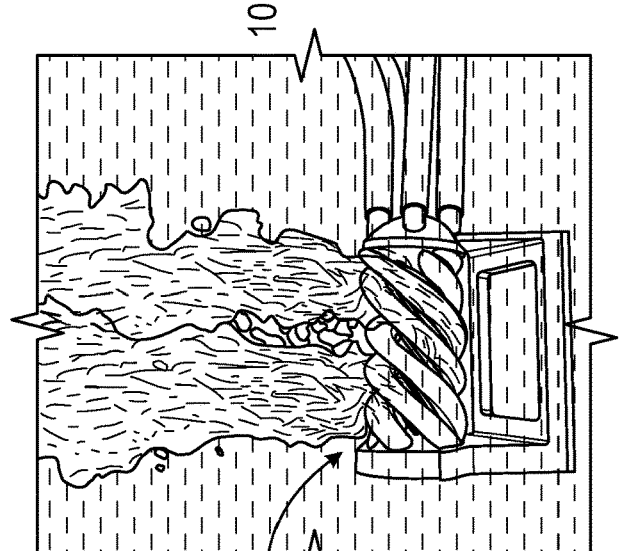
Figure 6C:
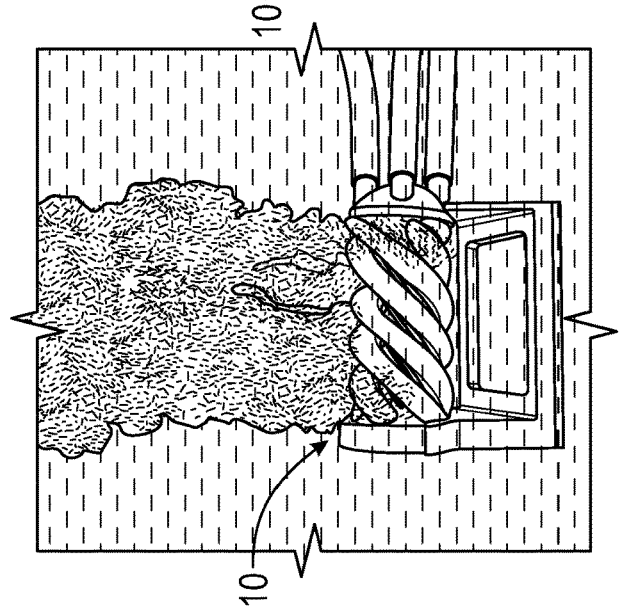

FIGS. 6A-C are depictions of various bubble sizes produced by selecting different media grades (MG); MG10 (FIG. 6A) creates fine bubble formation, MG20 (FIG. 6B) with medium sized bubbles, and MG80 (FIG. 6C) producing larger bubbles; All tubes had the same flow rate of gas.

Figure 7:
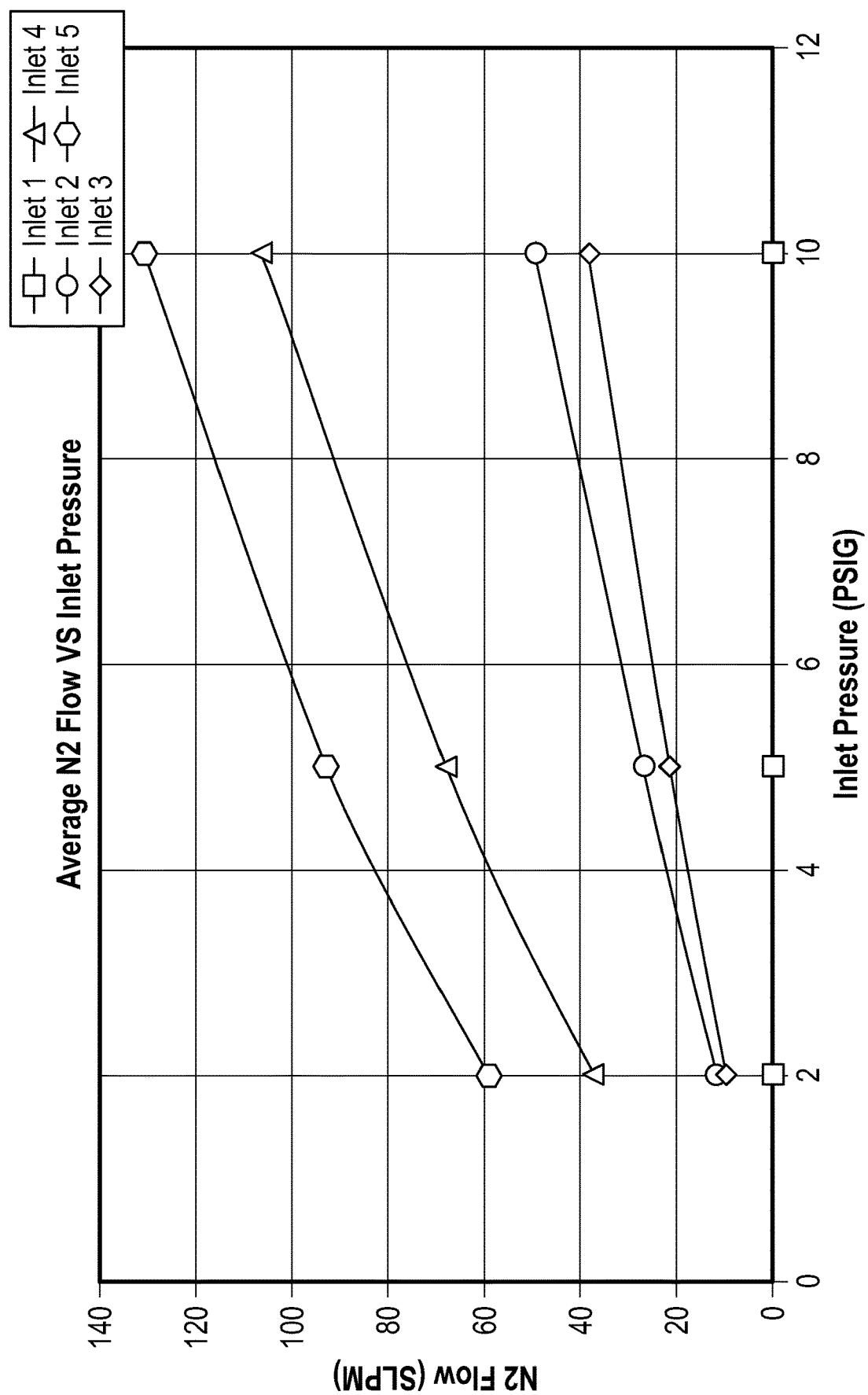

FIG. 7 shows flow versus pressure averages over three selectable media grade filter parts/assemblies. Each inlet was measured separately. Note that inlet #1 did not produce a measurable flow on any of the parts/assemblies tested, and inlet #3 had lower flow permeability than inlet #2, likely due to differences in pore size distribution or density. Further laser parameter optimization would likely fix those issues.

Figure 8:
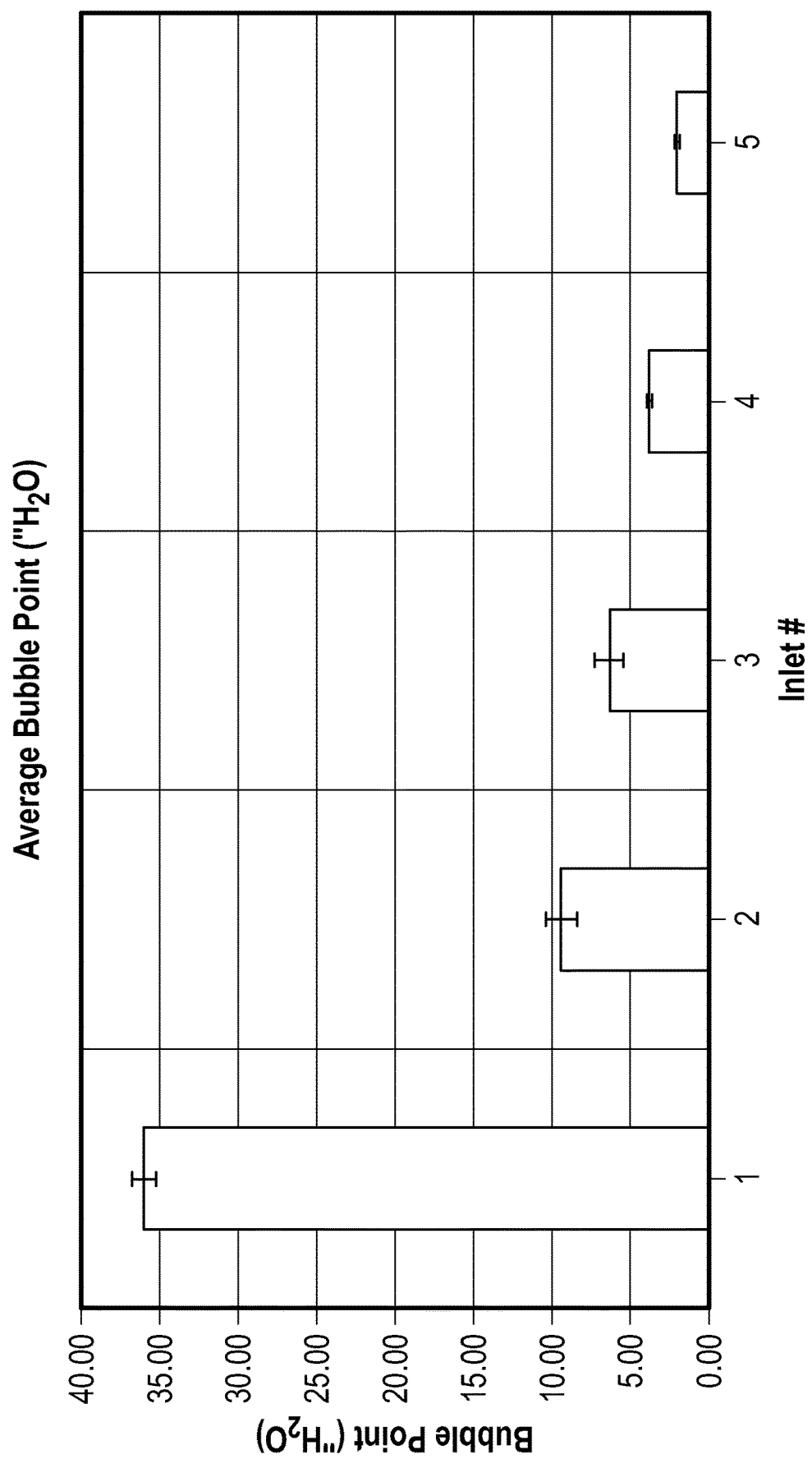

FIG. 8 shows bubble point averages vs inlet number over three selectable media grade filter parts/assemblies.

Figure 9:
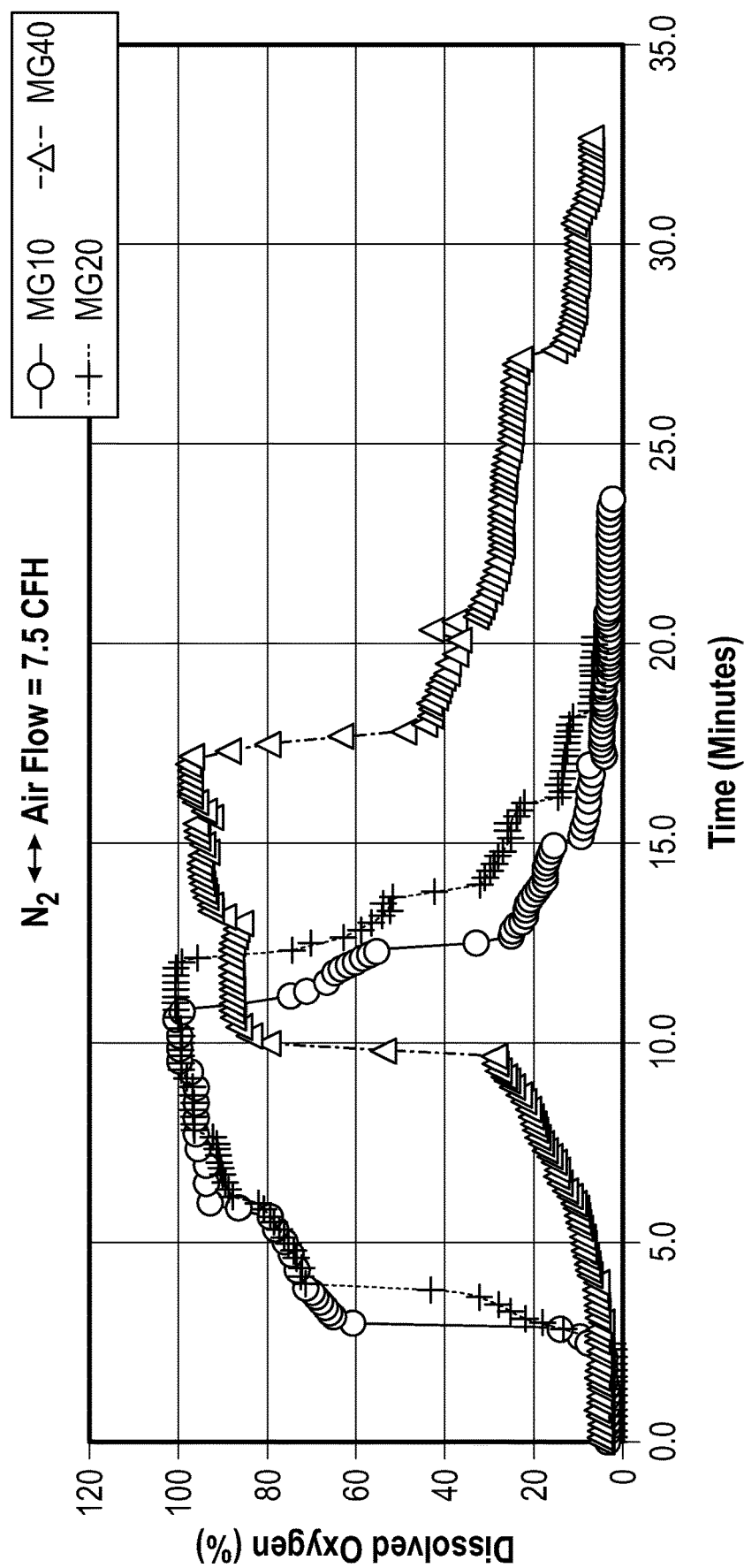

FIG. 9 is plot of dissolved oxygen % vs time for three of the tubes in the selectable media grade filter. Oxygen was completely stripped to start each run. Air was introduced at a rate of 7.5 CFH (cubic-feet-hour) for each run. Once approximately 100% $O_2$ saturation was reached, the gas was switched to 7.5 CFH of $N_2$, allowing the $O_2$ to be stripped out of the water again. The rates of saturation and depletion decreased with increasing media grade rating (nominal pore size).

DETAILED DESCRIPTION OF THE DISCLOSURE

The exemplary embodiments disclosed herein are illustrative of advantageous selectable media filter and sparger assemblies, and systems of the present disclosure and methods/techniques thereof. It should be understood, however, that the disclosed embodiments are merely exemplary of the present disclosure, which may be embodied in various forms. Therefore, details disclosed herein with reference to exemplary selectable media filter and sparger assemblies and associated processes/techniques of fabrication/assembly and use are not to be interpreted as limiting, but merely as the basis for teaching one skilled in the art how to make and use the advantageous selectable media filter and sparger assemblies and/or alternative assemblies of the present disclosure.

The present disclosure provides advantageous selectable media filter and sparger assemblies, and improved systems/methods for utilizing and/or fabricating the selectable media filter and sparger assemblies.

More particularly, the present disclosure provides selectable media filter and sparger assemblies fabricated at least in part by additive manufacturing (e.g., via a 3D printing process, such as, for example, via a laser powder bed fusion (LPBF) process, via an electron-beam melting ("EBM") process, via an inkjet or a binder-jet additive manufacturing process, etc.), the selectable media filter and sparger assemblies including a plurality of filtration and/or sparging members attached to a single housing, with each filtration/sparging member having an independent connection port.

Referring now to the drawings, like parts are marked throughout the specification and drawings with the same reference numerals, respectively. Drawing figures are not necessarily to scale and in certain views, parts may have been exaggerated for purposes of clarity.

FIG. 1 is a side perspective view of an exemplary selectable media filter and sparger assembly 10.

In exemplary embodiments, selectable media filter and sparger assembly 10 includes a plurality of filtration and/or sparging members 12A, 12B, 12C, 12D, 12E attached to a single housing 14 (e.g., solid housing cap 14), with each filtration/sparging member having an independent respective connection port 17A-17E. In certain embodiments, assembly 10 includes support member 16 (e.g., solid center support member 16 extending from housing 14). It is noted that assembly 10 can include any suitable number of filtration and/or sparging members 12A, 12B, etc.

In exemplary embodiments, the present disclosure provides selectable media filter and sparger assemblies 10 fabricated at least in part by additive manufacturing (e.g., via a 3D printing process, such as, for example, via a laser powder bed fusion (LPBF) process, via an electron-beam melting ("EBM") process, via an inkjet or a binder-jet additive manufacturing process, etc.), the selectable media filter and sparger assemblies 10 including a plurality of filtration and/or sparging members 12A-12D attached to a single housing 14, with each filtration/sparging member 12A-12D having an independent respective connection port 17A-17E, thereby providing significant operational, manufacturing, commercial and/or revenue advantages as a result, and as discussed further below.

In exemplary embodiments, the selectable media filter and sparger assembly 10 is an additively manufactured assembly 10 fabricated from metal, with the assembly 10 including a plurality of filtration/sparging members 12A-12E attached to a single housing 14. These members 12A-12E can be fabricated with a variety of different pore structures/densities to fit numerous application needs.

In certain embodiments, the members 12A-12E have a helical shape and can be further modified to maximize the porous media surface area without increasing the overall length/width of the assembly 10. Each member 12A-12E has an independent respective connection port 17A-17E that can accept a variety of fittings for filtrate removal or supply gas/liquid.

Exemplary assembly 10 can be used for any sparging applications that require gas/liquid mass transfer (e.g., bioreactors, fermentation tanks, oxygenation, oxygen stripping). The assembly 10 can also be used for filtration applications requiring specific particle size capture of feed stock or particle size selection in filtrate material, and/or for filtration of ions, molecules, or chemicals, and/or including nano/molecular level filtration.

The exemplary assembly 10 comprises a plurality of members/elements 12A-12E that can exhibit a variety of sparging and/or filtration properties.

For sparging, this allows the user to control the mass transfer rate by simply selecting the appropriate member/element 12A-12E.

For filtration applications, the appropriate members/elements 12A-12E can provide segmented particle size range capture under the same process.

Conventional practice provides that for both sparging and filtration this would require the user to swap out components which would require interruption of the process system as well as increased time required to perform the swaps. Additionally and advantageously, the additive manufacturing process of the present disclosure allows for these members/elements 12A-12E to be designed with much higher surface area compared to similarly sized, conventional members/elements. It is noted that increased surface area improves filtration capacity, reduces pressure drop across the porous media and contributes to increased mass transfer rates.

It is noted that measurement data of filtration efficiency and gas/liquid mass transfer rate of the various members/elements 12A-12E in a single installation of assembly 10 is desired and planned.

FIG. 1 shows an example profile of a selectable media grade filter assembly 10. It is noted that the connection ports 17A-17E can be customized for the application (e.g., barb fittings, threaded ports, quick connect, etc.). The barb fittings can be printed as-is, while the other connection options can require post process machining to clean up or make the threads (e.g., on ports 17A-17E).

In an example embodiment of FIG. 1, the five porous elements 12A-12E can classify as media grade (MG) 1, 10, 20, 40, and/or 80.

FIG. 7 shows the average nitrogen flow vs inlet pressure (as well as the average bubble point readings in FIG. 8) at each of the five inlets for three selectable media grade filter assemblies. The repeatability between the different assemblies was consistent with what has been observed on other additive manufacturing porous builds. In the cases, inlet #1 did not produce measurable flow data. It was also observed that inlet 2 (MG10) exhibited higher flow permeability vs inlet 3 (MG20). This was counter-intuitive based on media grade (MG) characterization alone. The potential mechanism for observing lower flow permeability with a larger pore size could be in the pore size distribution or overall density. Further optimization of the laser parameters for inlet 3 will likely solve that issue.

A second example selectable media filter and sparger assembly 100, with altered inlet/member geometries (112A-112E) is shown in FIGS. 4-5. The star-like pattern of members 112A-112E increases the surface area of each porous inlet/member by 2 in$^2$, going from 13.83 in$^2$ for each respective members 12-12E in assembly 10, to 15.88 in$^2$ in each respective members 112-112E in assembly 100. This allows for increased flow permeability (e.g., lower pressure-drop) behavior without needing to change the media grade of the inlet.

FIGS. 6A-C are depictions of various bubble sizes produced by selecting different media grades (MG); MG10 (FIG. 6A) creates fine bubble formation, MG20 (FIG. 6B) with medium sized bubbles, and MG80 (FIG. 6C) producing larger bubbles; All tubes had the same flow rate of gas.

As such, FIGS. 6A-6C shows examples of the various bubble sizes generated by using different media grades within the selectable media filter and sparger assembly. The inlet gas flow was kept constant for each tube. The image in FIG. 6A shows the bubble formation from a MG 10 element. The bubbles in this setting are very fine less than about 0.5 mm. The middle image in FIG. 6B shows a MG20 element producing medium sized bubbles around 1 mm, and the image in FIG. 6C shows a MG80 element producing larger bubbles greater than 1.5 mm.

FIG. 9 shows a plot of dissolved oxygen (DO) percentage vs time for three of the porous tubes/assemblies. The MG10, MG20 and MG40 tubes/assemblies were submerged in a tank of water at 20° C. and pressurized with gas. The gas pressure was controlled via a regulator to produce a flow rate of 7.5 cubic feet per hour (CFH) for each tube. The pressures required to produce that flow rate differed for each tube/assembly due to the variations in porosity. A dissolved oxygen meter (electrolytic cell type) was used to record dissolved oxygen content and temperature vs time.

For each test, the tank of water was stripped of $O_2$ by sparging $N_2$ until the dissolved oxygen readings were minimized. The gas source was then switched to air, running until the DO is maximized near 100%. At that point, the gas is switched back to $N_2$, stripping the oxygen back out of the system. Since the gas flow rates are fixed for each tube/assembly, it was proposed that the rates of oxygenation and oxygen stripping are dependant on the media grades producing different bubble sizes and concentrations in the given volume. This allows for fine tuning gas delivery rates based on media grade selection, separate from process gas inputs.

It was observed that the $O_2$ saturation and depletion rates decrease with increasing media grade ratings. The higher concentration of smaller bubbles in the 10 media grade tube/assembly allow for more efficient gas/liquid mass transfer compared to the larger, more disperse bubbles produced by the larger pore size media grades.

Several advantages of additive manufacturing include, but are not limited to, the consolidation of multiple components, increased geometric freedom, and the ability to control porosity in specific regions. The selectable media grade filter assembly 10 was created to showcase certain additive manufacturing capabilities with direct ties to applications in filtration, flow control and gas/liquid mass transfer (sparging). It should be noted that the assemblies/parts presented herein are example embodiments. The selectable media grade filter assemblies can be further modified with different surface areas, number of filter elements/ports, element shapes, and media grades for specific/customized applications. Media grade (MG) when listed as MG #, e.g., MG10 represents the nominal pore size of the media in microns. Thus, a MG10 assembly/part would have a nominal pore size of 10 microns within a distribution of smaller and larger pores. The selectable media grade filter assemblies can also be scaled to various sizes. For example, the initial concept assembly is 7.5" tall×2.75" diameter, while other assemblies have been printed to 3.75" tall×1.5" diameter and 1.75" tall×0.75" diameter.

The ability to have individual ports (17A-17E) to each porous element (12A-12E) allows the use with a multitude of gasses. For example, several elements can be plumbed to $N_2$ while others can be plumbed to $O_2$, allowing for oxygen depletion and saturation control while in-use. Other combinations of gas species can be used that control the rates of certain reactions. Overall, the selectable media grade filter assemblies allow for changing the gas species without interrupting the test system. This is valuable for applications such as bio-reactors, reaction vessels or carbonation tanks. These systems can see higher throughput, more testing iterations, or enable in-situ measurements that were previously not possible with a single element system.

Similar advantages are realized with the ability to customize the porosity within the elements (12A-12E). Different pore sizes will produce different bubble sizes in a given sparging application. The size of the bubbles impacts the efficiency of the gas/liquid mass transfer. Therefore, using a selectable media grade filter assembly (e.g., assembly 10) with various media grades, allows the user to control the transfer rates by selecting the appropriate media grade for the given application. Employing a selectable media grade filter assembly with different media grade elements also allows for control of filtration levels when used in applications where the flow is reversed (going from sparging to filtration). This enables selective filtering of different particle size ranges within a mixture.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A selectable media filter and sparger assembly comprising:
    a housing;
    a plurality of porous members attached to the housing; and
    each porous member of the plurality of porous members having an independent connection port; and
    wherein the selectable media filter and sparger assembly is fabricated at least in part by additive manufacturing;
    wherein the housing is a single housing;
    wherein the housing has a solid housing cap;
    wherein the plurality of porous members are fabricated with different pore structures and/or densities relative to each other for a flow to pass therethrough at different rates; and
    wherein the plurality of porous members are fabricated at least in part from a metal.

2. The assembly of claim 1 further comprising a support member extending from the housing.

3. The assembly of claim 2, wherein the support member is a solid center support member extending from the housing.

4. The assembly of claim 1, wherein the plurality of porous members includes five porous members attached to the housing.

5. The assembly of claim 1, wherein each porous member has a helical shape.

6. The assembly of claim 1, wherein each connection port is configured to accept a fitting for filtrate removal or supply gas or liquid.

7. A system, comprising:
    a reaction vessel,
    the assembly of claim 1, wherein in operation, one or more of the connection ports is configured for being fluidly coupled to a supply of nitrogen while another one or more of the connection ports is configured for being fluidly coupled to a supply of oxygen, to thereby obtain a predetermined level of oxygen depletion and saturation within the reaction vessel.

8. A method of fabricating the selectable media filter and sparger assembly of claim 1, the method comprising:
    providing the plurality of porous members attached to the housing;
    wherein each of the plurality of porous members is fluidly coupled to one connection port of the plurality of connection ports; and wherein the selectable media filter and sparger assembly is fabricated at least in part by additive manufacturing.

9. The method of claim 8, wherein the selectable media filter and sparger assembly is fabricated at least in part by a 3D printing process.

10. The method of claim 8, wherein the selectable media filter and sparger assembly is fabricated at least in part by a laser powder bed fusion (LPBF) process.

11. The method of claim 8, wherein the selectable media filter and sparger assembly is fabricated at least in part by an electron-beam melting ("EBM") process.

12. The method of claim 8, wherein the selectable media filter and sparger assembly is fabricated at least in part by an inkjet or a binder-jet additive manufacturing process.

13. A system, comprising:

a reaction vessel, the assembly of claim 1, wherein pore structures of the porous members differ from each other, and in operation, one or more of the connection ports is configured for being fluidly coupled to a supply of a carbon dioxide while another one or more of the connection ports is configured for being fluidly coupled to a supply of oxygen, wherein the pore structures of the porous members fluidly coupled to the supply of oxygen is smaller than the pore structures of the porous members fluidly coupled to the supply of carbon dioxide, to thereby control a mass transfer rate of the carbon dioxide and oxygen in the reaction vessel.

14. The assembly of claim 1, wherein a cross section of the porous members is non-circular.

15. The assembly of claim 1, wherein a cross section of the porous members is circular.

16. A selectable media filter and sparger assembly comprising:

a housing, defining a unitary solid housing, extending from a first end that defines a solid endcap to a second end that defines a manifold;

a plurality of porous members attached to the housing, each porous member of the plurality of porous members being tubular shaped, defined by a porous tubular wall, and extending around a center of the housing, from the first end to the second end of the housing, wherein the plurality of porous members are fabricated with different pore structures and/or densities relative to each other for a flow to pass therethrough at different rates; and a plurality of connection ports disposed at the second end of the housing and extending away from the second end of the housing, each connection port of the plurality of connection ports is tubular shaped and connected to one of the porous members, wherein, in operation, a flow is configured to flow separately, via one or more of:

(i) into one or more of the plurality of porous members of the assembly via one or more of the plurality of connection ports, and out of the assembly via pores in the one or more plurality of porous members; and (ii) into one or more the plurality of porous members of the assembly via pores in the one or more plurality of porous members, and out of the assembly via the one or more of plurality of connection ports that are fluidly coupled to the one or more of the plurality of porous members, and wherein the selectable media filter and sparger assembly is fabricated at least in part by additive manufacturing, such that the housing, porous members and connection ports form a unitary assembly.

17. The assembly of claim 16, wherein the porous members extend helically around the center support member.

* * * * *